Nov. 12, 1935. C. L. SNYDER 2,020,858
DECKING APPARATUS
Filed Dec. 28, 1931 2 Sheets-Sheet 1
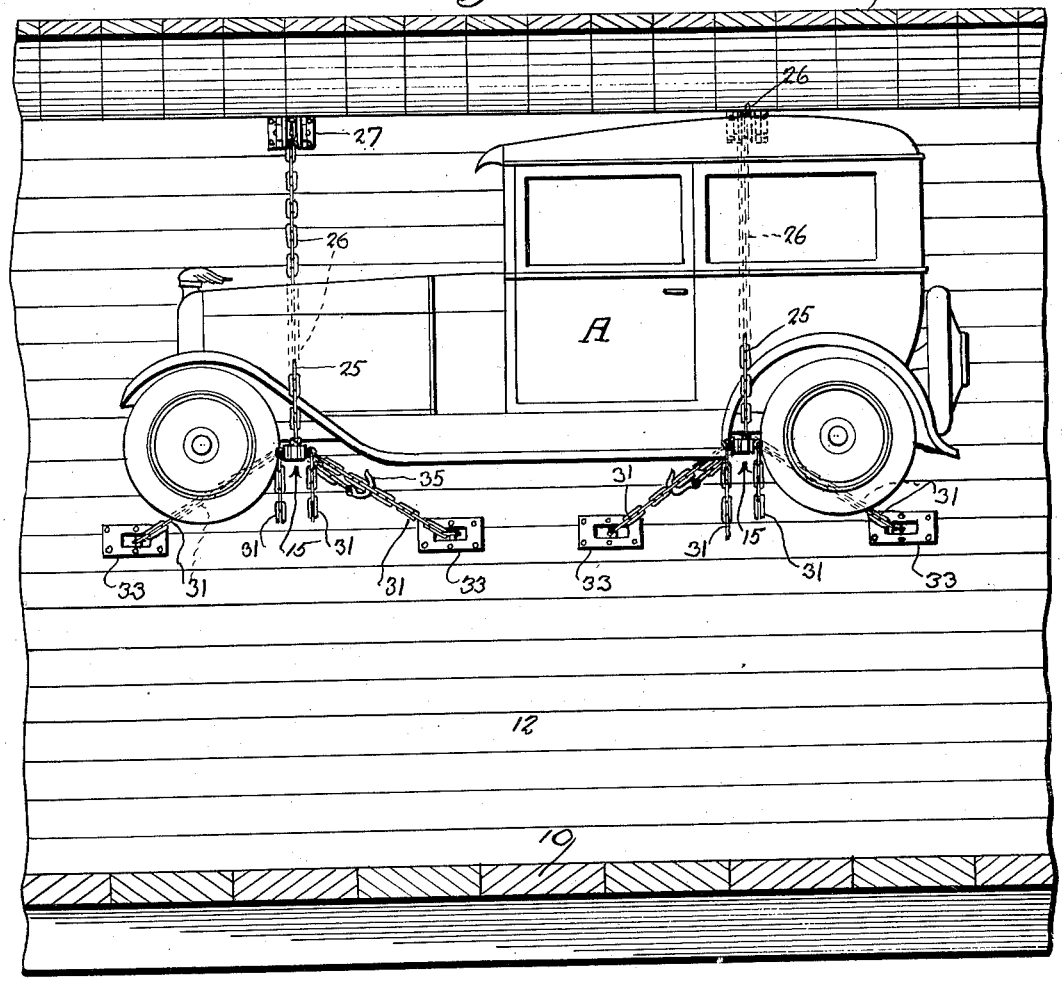
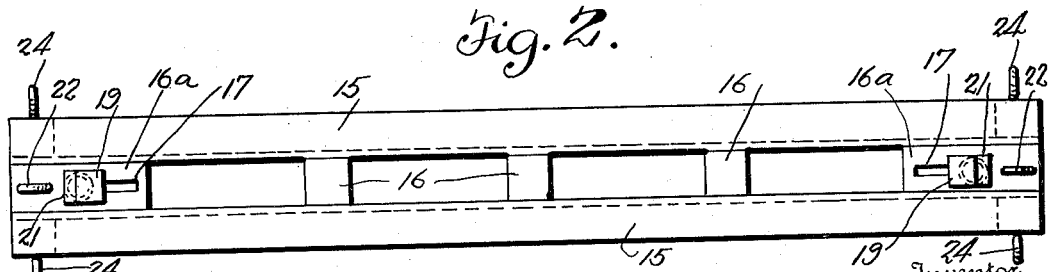
Inventor
Clifford L. Snyder.
By
M. Bryant
Attorney.

Nov. 12, 1935.   C. L. SNYDER   2,020,858
DECKING APPARATUS
Filed Dec. 28, 1931   2 Sheets-Sheet 2
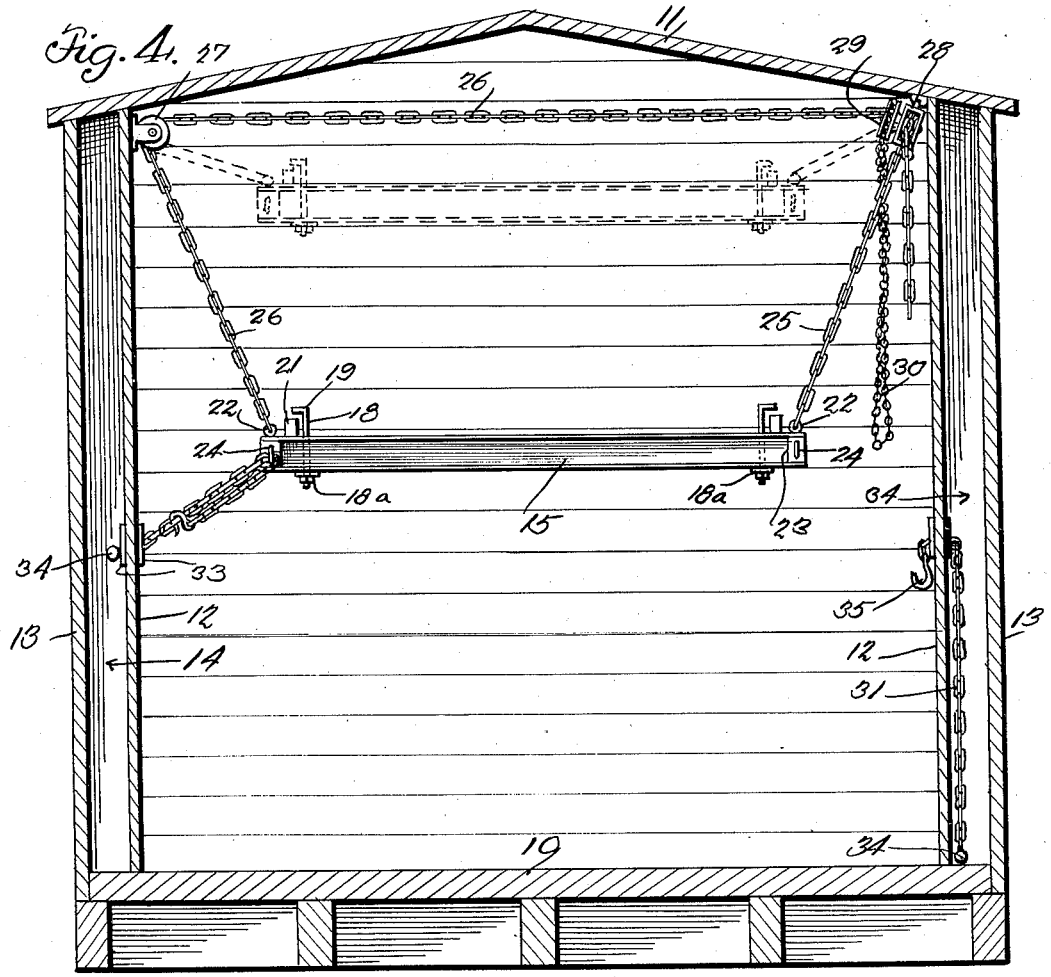
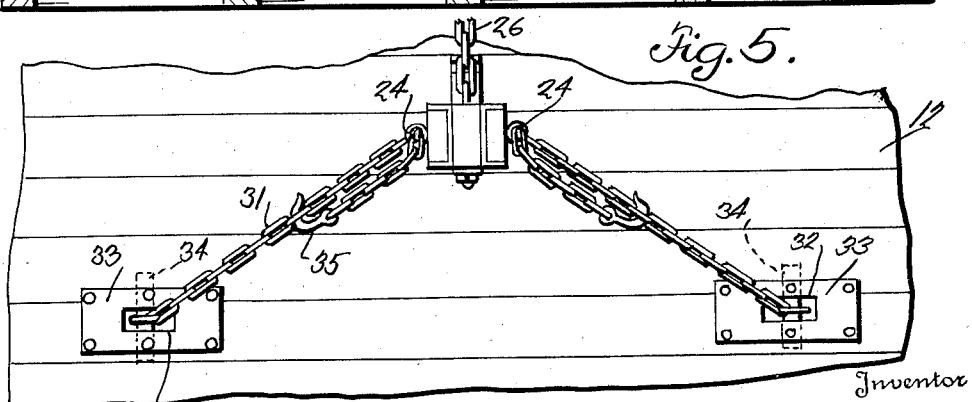
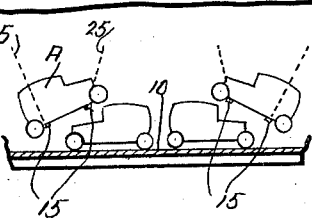

Patented Nov. 12, 1935

2,020,858

UNITED STATES PATENT OFFICE 2,020,858

DECKING APPARATUS

Clifford L. Snyder, Detroit, Mich., assignor, by mesne assignments, to The Worth Company, a corporation of Michigan Application December 28, 1931, Serial No. 583,589

1 Claim. (Cl. 105—368)

This invention relates to certain new and useful improvements in decking apparatus.

The primary object of the invention is to provide decking apparatus for the shipment of automobiles in freight cars wherein the use of rigid hanger and brace bars are eliminated, and suspension and tension chains substituted therefor for the support of an automobile.

It is a further object of the invention to provide decking apparatus of the foregoing character wherein the automobile support of the decking apparatus is adapted to receive and be engaged with the frame bars of the automobile.

A still further object of the invention is to provide decking apparatus wherein the support for the automobile has hoist means associated therewith that also function as suspending devices with tension members interposed between the automobile support and car structure and cooperating with the combined hoist and suspension means for the rigid support of the automobile.

Another object of the invention is to provide decking apparatus for use in the shipment of automobiles wherein the supporting element of the apparatus is carried by combined hoist and suspension means and adapted to be disposed adjacent the roof of the car when out of use with tension devices interposed between the supporting means and car and detachably engaged with the supporting means for storage within the double wall construction of the car when out of use.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a fragmentary vertical longitudinal sectional view of a railroad car with the decking apparatus arranged therein with an automobile supported thereby;

Figure 2 is a top plan view of the automobile supporting cross-bar of the decking apparatus;

Figure 3 is a fragmentary side elevational view of the cross-bar with a part of the automobile frame bar illustrated in section and mounted upon the supporting bar;

Figure 4 is a vertical cross-sectional view of the car with the decking apparatus therein, showing one of the tension members disengaged from the cross-bar and housed within the double wall construction of the car, and the decking apparatus illustrated by dotted lines in an inoperative position adjacent the car roof;

Figure 5 is a fragmentary elevational view showing the tension members extending between the side wall of the car and the adjacent end of the automobile supporting bar of the decking apparatus; and Figure 6 is a schematic view, formed in section showing automobiles decked and anchored in position for shipment.

The railroad car with which the decking apparatus is associated comprises a floor 10, roof 11 and a double construction of side walls including inner and outer side wall members 12 and 13 respectively defining an intervening channel 14. The decking apparatus is permanently positioned within the car and includes means extending transversely of the car to receive and have an automobile frame anchored thereto, a combined hoist and suspension means for the transverse member that moves the latter to a position adjacent the roof of the car when out of use and tension means interposed between the ends of the transverse means and the car wall to be housed within the channel 14 when out of use.

The decking apparatus including transversely extending supporting means for an automobile in the form of a bar, preferably formed of a pair of channel irons 15, arranged back to back, and retained in spaced relation by interposed spacer blocks 16 as shown in detail in Figure 2. The end spacer blocks 16a are of elongated form and are longitudinally slotted as at 17 for the free passage therethrough of a screw shank 18 of an angle clamp 19 that is adapted to be engaged with the frame bar 20 of the automobile A, the spacer block 16a carrying a cushion support 21 upon which the frame bar 20 of the automobile is supported and said block 21 may be of a rubber characteristic, or embody metallic springs. Each end spacer block 16a has an eye 22 rising perpendicularly therefrom while each outer side of the channel members 15 at opposite ends has a block 23 anchored therein and carrying an outwardly directed eye 24.

Combined hoist and suspension means is provided by the transversely extending supporting member and includes chains 25 and 26 respectively engaged with the eyes 22 at the upper side of the transverse member, the chain 26 being directed upwardly at an inclined direction for passage over the guide pulley 27 supported on the upper end of the inner wall section 12 of the adjacent side wall of the car, the chain 26 then extending transversely of the car for engagement in the sheath block 28. The hoist and suspension chain 25 extends upwardly in an inclined direction for engagement with the sheath block 28. A chain pulley 29 is associated with the sheath block 28 and is operated by the chain 30 to effect raising and lowering movement of the transverse member that supports the automobile.

Tension devices are interposed between opposite ends of the transverse member and the side walls of the car to effect rigid disposition of the transverse member and such means includes a chain 31 passing through a side eye 24 with one end of the chain passing through an opening in the inner wall section 12 of the side wall and through slotted openings 32 in face plates 33 provided at opposite sides of the wall section 12 and secured thereto in any suitable member, the end of the chain 31 extending into the chamber 14 carrying a cross pin 34 to prevent disengagement of the chain from the car wall, the other end of the chain 31 carrying a hook 35 that prevents complete passage of the chain through the plate slot 32 when the chains are inoperatively positioned as illustrated in Figure 4 as housed within the chamber 14. The chains 31 extending from opposite sides of the transverse member 15 are directed in downward and lateral directions toward the walls of the car.

To lug the automobile A on the decking structure, the tension chains 31 are disengaged from the transverse member 15 and are positioned within the channels 14 of the car walls, the chains 30 then operated to lower the transverse member 15 for positioning beneath the automobile, the frame bars 20 of the automobile being mounted upon the cushion blocks 21, the clamps 19 then engaged with the frame bars 20 and tightened by the nuts 18a mounted upon the lower threaded ends of the shanks 18 of the clamps. The combined hoist and suspension means is then operated to elevate the automobile and when in proper position, the tension chains 31 are withdrawn from the channels 14 of the side walls of the car, such movement being limited by the cross pins 34, the chains 31 passed through the eyes 24 and the hooks 35 thereof engaged with a link of the chain 31, as shown in Figure 5. Further operation of the hoist means places the chains 21 under tension, with the transverse member 15 that supports the automobile retained against vibratory movement, and in effect provides a rigid support for the automobile. The automobiles may be decked as diagrammatically illustrated in Figure 6 or one automobile may be elevated to decked position as illustrated in Figure 1, with other equipment shipped in the car therebeneath. When the decking apparatus is out of use, the chains 31 are stored within the chamber 14 of the side walls as illustrated in Figure 4 and the transverse member raised to a position adjacent the car roof as illustrated by dotted lines in said figure, the interior area of the car being substantially cleared of the decking apparatus for the shipment of any other articles desired.

From the above detailed description of the invention, it is believed that the construction and operation thereof will at once be apparent, and while there is herein shown and described the preferred embodiment of the invention, it is nevertheless to be understood that minor changes may be made therein without departing from the spirit and scope of the invention as claimed.

I claim:—

In decking apparatus, the combination with a shipping car, of means for the support of an automobile including a transversely extending bar spaced at its ends from the side walls of the car, combined raising and suspension chains for the bar attached to the ends of the bar and inclined upwardly and outwardly for supporting engagement with the upper ends of the side walls of the car and pairs of anchor chains between, each end of the bar and adjacent side wall of the car attached to the car in a plane below the bar and respectively forwardly and rearwardly of the bar for cooperation with the combined raising and suspension chains for holding the automobile against movement, the bar including a pair of channel members arranged back to back and spacer blocks between the channel members, the end spacer blocks being slotted, and clamping members adjustably attached to the slotted spacer blocks.

CLIFFORD L. SNYDER.